July 21, 1964 L. C. GUINGRICH 3,141,704
WHEEL COVER
Filed Aug. 6, 1962
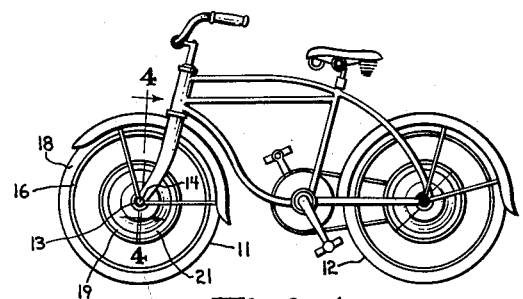
Fig. 1.
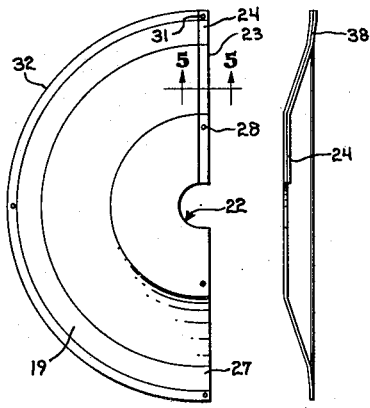
Fig. 2. Fig. 3.
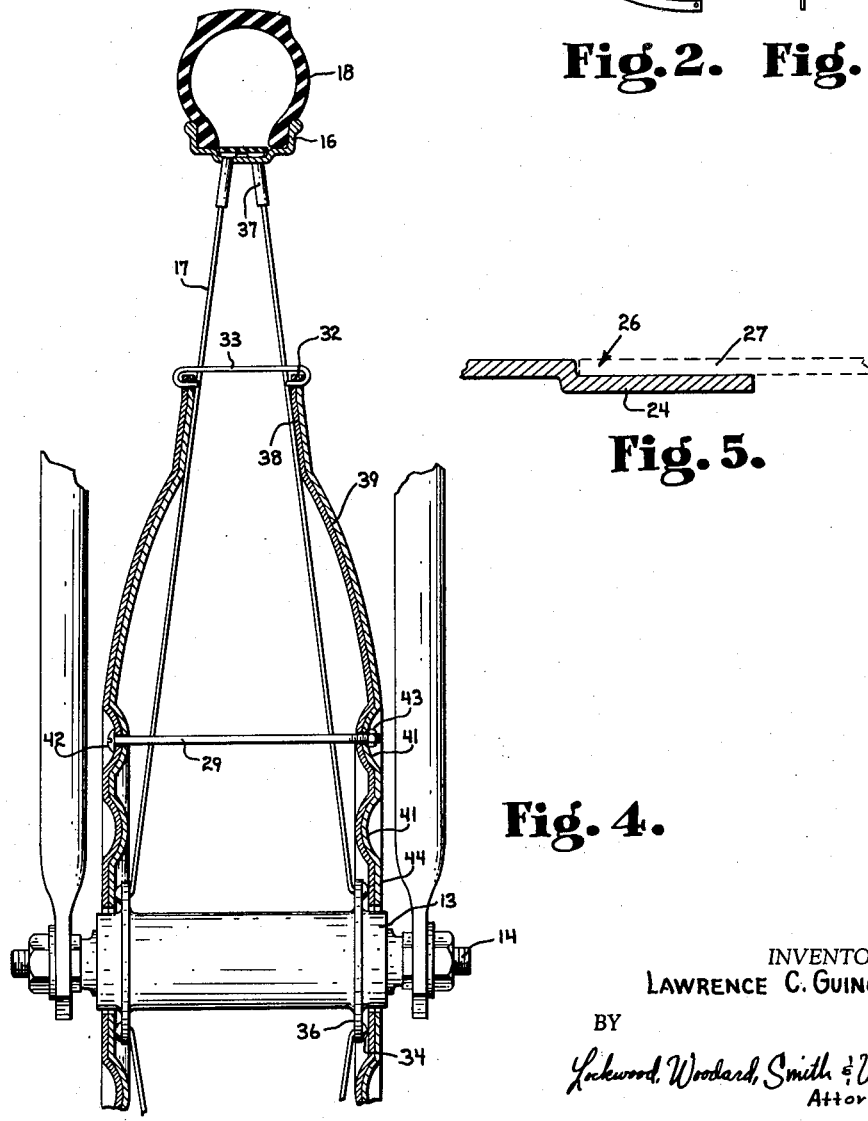
Fig. 5.
Fig. 4.
INVENTOR.
LAWRENCE C. GUINGRICH
BY
Lockwood, Woodard, Smith & Weikart
Attorneys

United States Patent Office 3,141,704
Patented July 21, 1964

3,141,704
WHEEL COVER
Lawrence C. Guingrich, 3446 Nolen Drive,
Indianapolis 24, Ind.
Filed Aug. 6, 1962, Ser. No. 215,026
2 Claims. (Cl. 301—37)

This invention relates generally to vehicle wheels, and more particularly to a novel cover attachment for bicycle wheels.

It is well known that the spokes of bicycle wheels are rather susceptible to damage during bicycle operation either by striking foreign objects or by the wedging of foreign objects between the spokes and the bicycle frame. Also, they can be readily damaged by being kicked, stepped on, or struck by pedals or other bicycles, when parked in a bicycle rack.

It is also well known that it is difficult to see and recognize a bicycle after dark when approaching it broadside. This is true regardless of whether or not the bicycle is equipped with lights.

It is, therefore, an object of this invention to provide an economical safety device for a bicycle.

A further object is to provide means for protecting spokes of a wheel from damage.

A further object is to provide a safety device for use with bicycles, and which may be easily installed thereon.

A further object is to provide a device which achieves the foregoing objects and is well suited to provide a decorative feature.

The full nature of the invention will be understood from the accompanying drawings and the following description and claims:

FIG. 1 is a side view of a bicycle incorporating a typical embodiment of the invention.

FIG. 2 is an enlarged side view of one embodiment of the present invention.

FIG. 3 is a view of the embodiment of FIG. 2 as seen from the right-hand side of FIG. 2.

FIG. 4 is a greatly enlarged fragmentary cross sectional view of a second and preferred embodiment of the invention, the view being taken through the junction of the two halves of the cover as indicated by line 4—4 of FIG. 1.

FIGURE 5 is a partial cross-sectional enlarged view of connecting portions as shown in FIGURE 2.

Referring to the drawings in detail, the bicycle in FIG. 1 has the usual front and rear wheels 11 and 12, respectively. Each of the wheels includes a hub 13 mounted by suitable bearings (not shown) for rotation on an axle 14 which is in turn secured to the bicycle frame. A rim 16 is supported coaxially with the hub 13 and axle 14 by means of the spokes 17. A tire 18 is carried by the rim.

Each wheel cover according to the present invention comprises two halves 19 and 21 secured together and mounted on one side of the wheel. Referring more particularly to the embodiment of FIG. 2, the wheel cover half 19 is semi-circular in form and has a cutout 22 therein to receive the hub 13. Adjacent the straight marginal edge 23 at one side of the cutout, a marginal portion 24, which is offset from the major portion of the cover, provides a recess 26 to receive the marginal portion 27 of an identical half of the cover. FIG. 5 shows an enlarged detail of this arrangement. It is seen, therefore, that the cover can be formed of a pair of identical semi-circular members, as shown.

Apertures 28 are provided to receive tie bolts 29 (FIG. 4), whereby both halves of each cover are secured together and the covers are secured to each side of the wheel. Additional apertures 31 are provided adjacent the circumferential edge 32 whereby the spring members or wire clips 33 can secure the outer portions of the covers to the wheel and at the same time further secure together both halves of a cover assembly.

Referring now specifically to FIG. 4, the rim 16 is supported coaxially with the hub 13 and axle 14. This is accomplished in the usual manner by means of the spokes 17 having their headed ends 34 mounted in the flanges 36 of the hub, and having their threaded ends connected to the rim by means of the headed nuts 37. It is seen therefore, that the spokes on each side of the wheel are disposed in shallow cones which face each other. In other words, as the wheel rotates about the axle 14, each spoke defines a surface of revolution which is in the form of a shallow cone. Accordingly, in order for the covers of the present invention to neatly and satisfactorily engage the spokes, the outer marginal portions 38 thereof are in the form of shallow cones. The portions 39 radially inward of the portions 38 are generally convex, and, of course, the cutouts 22 in each half cooperate when the halves are assembled, to provide the aperture receiving the hub 13. The hub 13 is substantially longer than the width of the rim 16 and tire 18 so that portions 39, having a reflective material thereon, present a surface readily visible from any direction from the wheel. More specifically, the convex portions 39 extend outwardly from the spokes beyond a plane tangent to the tire 18 and substantially perpendicular to the hub 13 thereby providing the aforementioned visible surface.

In the preferred embodiment illustrated in FIG. 4, the covers are formed with concave circular grooves 41 which are coaxial with the circumferential edge 32. The outer one of the two grooves in each cover provides a convenient recess for the head 42 and nut 43 on the tie bolts 29. When these bolts are tightened, the inner marginal portions 44 of the covers engage the heads at the inner ends of the spokes.

By reason of the fairly large extent of the marginal portions 38 of the covers, they can be securely retained on the spokes 17 by means of the spring members or clip 33 and the tie bolt 29 without any danger of deforming the spokes.

It can readily be seen that the covers according to the present invention provide substantial protection for the spokes against damage which can otherwise readily occur to them either during the operation of the bicycle or when the bicycle is parked, particularly in a bicycle rack. By providing the covers with luminous paint on the exterior surface thereof, the covers are effective to direct attention to the cyclist at night. In addition, of course, the covers can be readily employed to provide a nice decorative effect both in daylight and at night. The use of identical halves, which can readily be formed by stamping, permits the covers to be provided at a very nominal cost.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:
1. In combination,
   a generally cylindrical wheel hub having circular flanges adjacent opposite ends thereof;
   a plurality of spokes extending from said flanges;
   a circular rim secured to outer ends of said spokes and thereby mounted coaxially with said hub to form a wheel, said spokes lying in oppositely facing cones with conical axes colinear with the axis of said hub;
   said oppositely facing cones converging at said rim such that when said rim receives a tire said wheel hub is substantially longer than the width of said tire,
   a pair of identical semi-circular members on each side of said wheel, the members on one side of said wheel being identical to the members on the other side of said wheel, said members being formed with portions of one overlapping and mating with portions of another, said members having outer marginal portions embracing said spokes and said members having convex portions radially inwardly of said outer portions, said convex portions having apertures therein receiving said hubs, said convex portions extending outwardly of a plane tangent to said tire and substantially perpendicular to said hub thereby presenting a surface visible from any angle, said convex portions having a reflective material deposited thereon whereby said portions reflect light received from any direction, and means connecting the members on one side of said wheel to the members on the opposite side of said wheel, said connecting means also connecting together the two members of a pair on one side of said wheel, said connecting means including bolts passing through said wheel and through apertures in said members, and said connecting means further including spring members passing through said wheel and through apertures in said members adjacent outer marginal edges of said members.

2. In combination, a generally cylindrical wheel hub having flanges adjacent opposite ends thereof;

a circular rim;

a plurality of spokes extending between said flanges and said rim and connecting said rim and said hub in coaxial relation to form a wheel;

said spokes lying in oppositely facing cones having their apexes at said hubs, a generally dish-shaped disc mounted on each side of said wheel, said dish-shaped discs each having an inner portion substantially perpendicular to said wheel hub and in engagement with a flange of said wheel hub, said discs each having an outer marginal portion bearing against said spokes, said dish-shaped discs each further having a convex portion between said inner and outer portions which extends outwardly of a plane tangent to said rim and substantially perpendicular to said hub to present a readily visible surface, said convex portions having a reflective material thereon so that light is reflected from any direction, each of said discs having an aperture receiving a portion of said hub, and each of said discs being comprised of a pair of identical members, said members being formed with portions of one overlapping and mating with portions of another;

and means passing through said wheel and holding said discs in position adjacent said spokes.

References Cited in the file of this patent

UNITED STATES PATENTS

| | | |
|---|---|---|
| 2,997,344 | Whiteman | Aug. 22, 1961 |
| 3,004,798 | Tylle | Oct. 17, 1961 |

FOREIGN PATENTS

| | | |
|---|---|---|
| 595,271 | France | July 11, 1925 |
| 1,081,492 | France | June 9, 1954 |
| 111,428 | Great Britain | Nov. 29, 1917 |
| 178,999 | Great Britain | May 4, 1922 |